Jan. 5, 1943.  A. T. HARRIS  2,307,584
CALCULATING DEVICE
Filed July 29, 1940  6 Sheets-Sheet 1
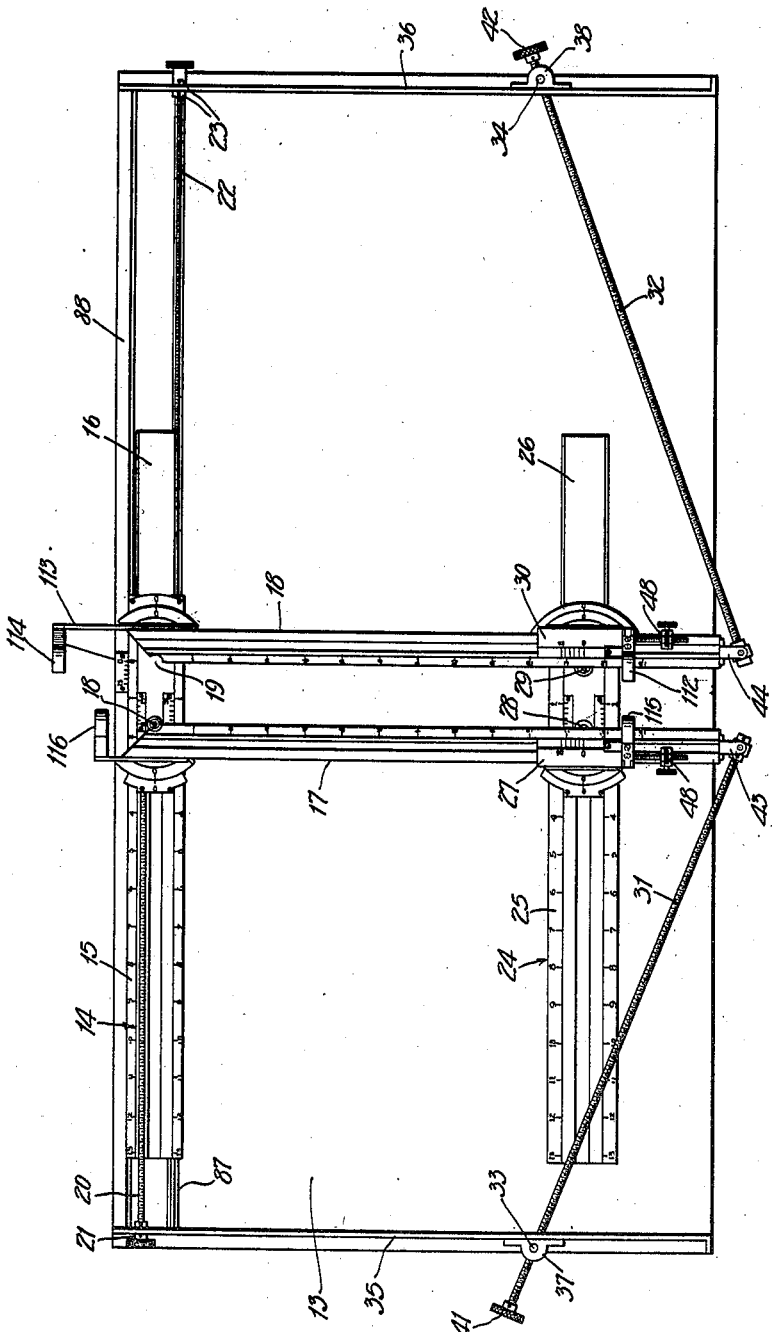
ALBERT T. HARRIS.
INVENTOR.
BY Herbert J Smith
ATTORNEY.

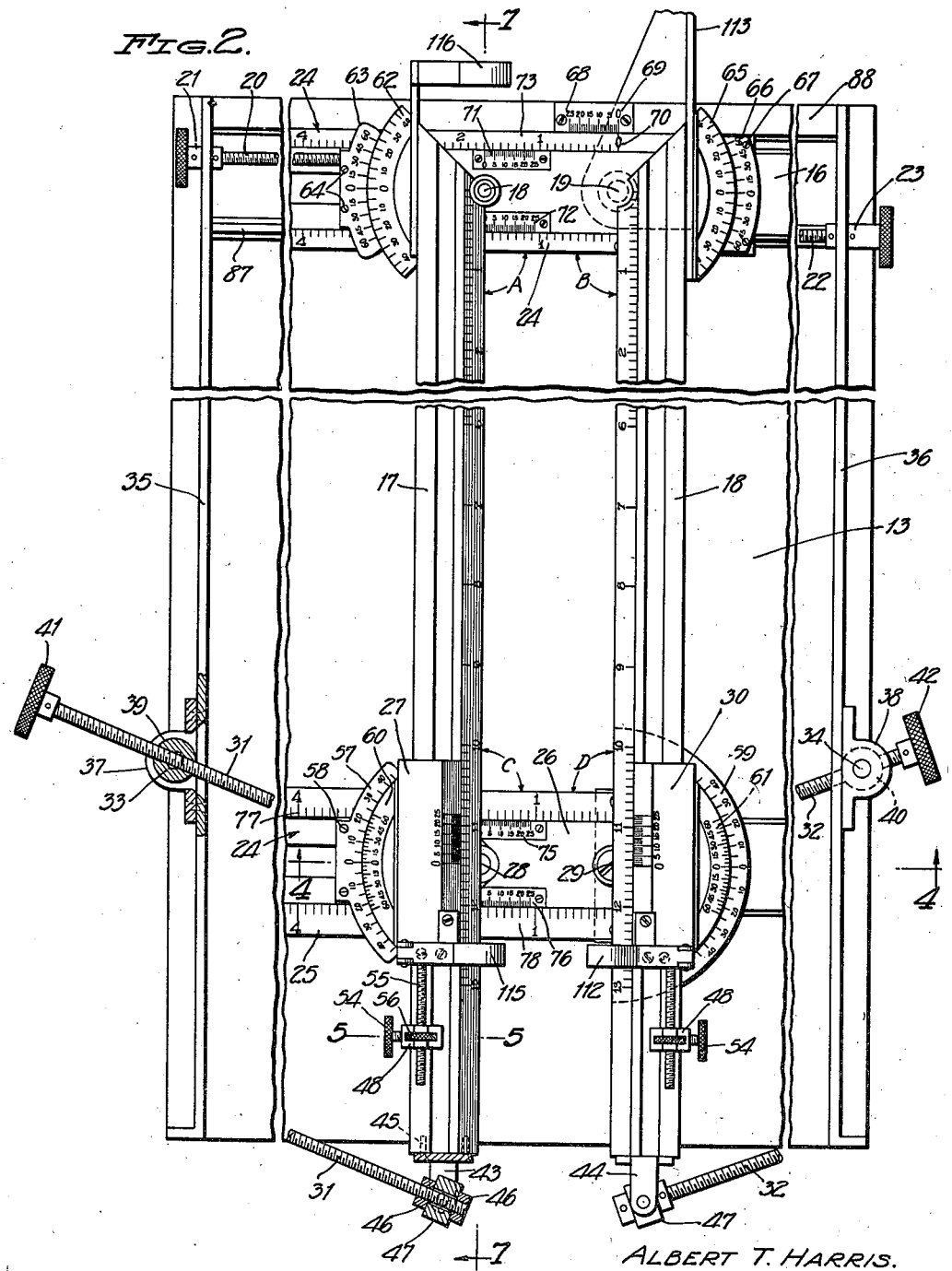

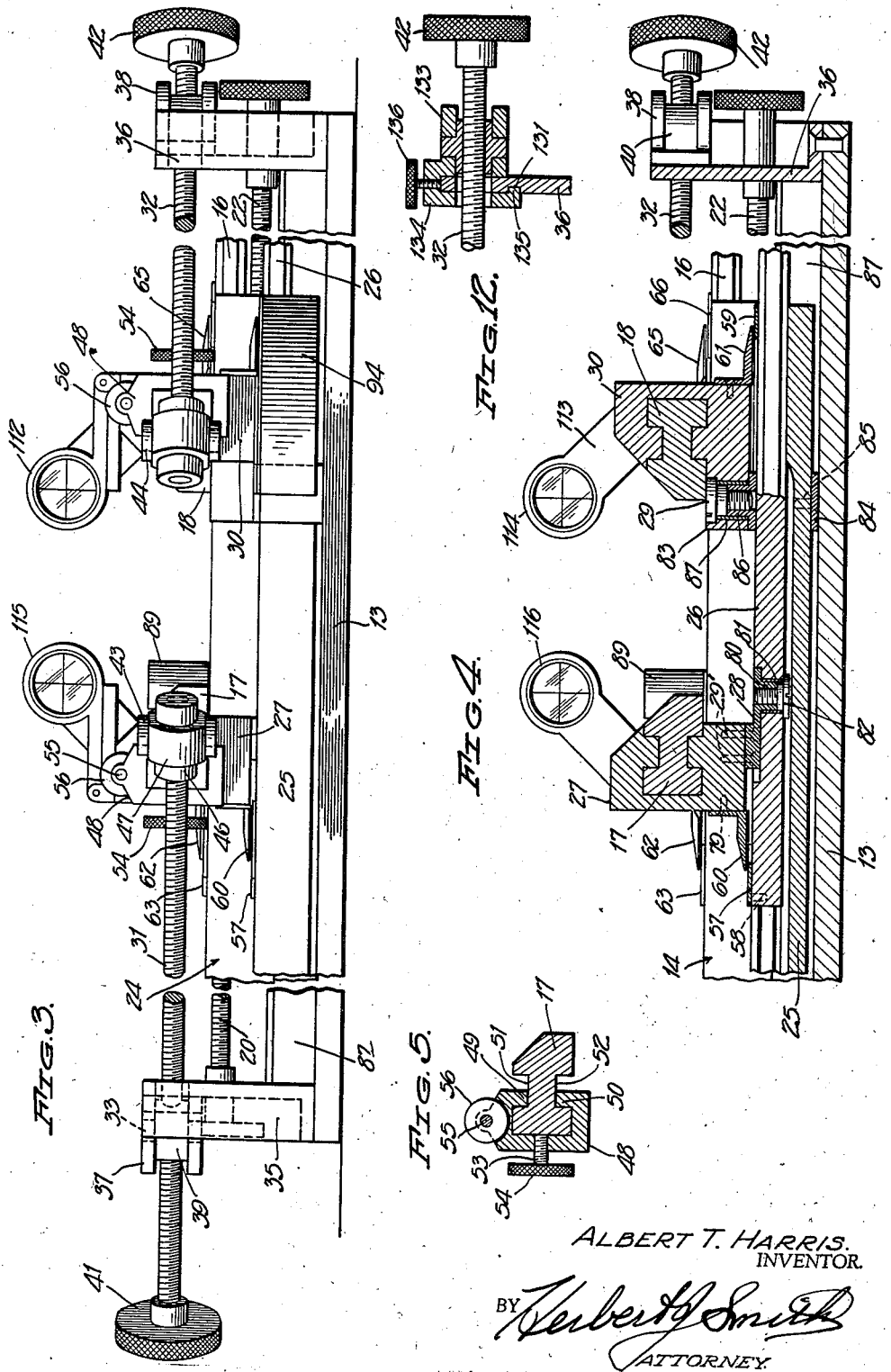

Jan. 5, 1943.  A. T. HARRIS  2,307,584
CALCULATING DEVICE
Filed July 29, 1940  6 Sheets-Sheet 4
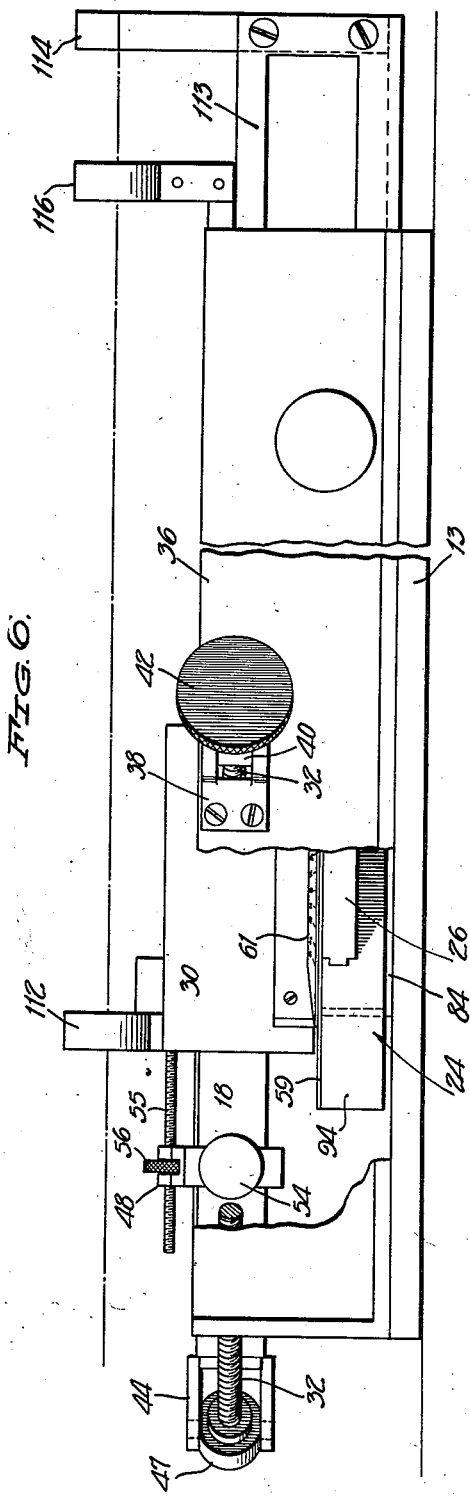
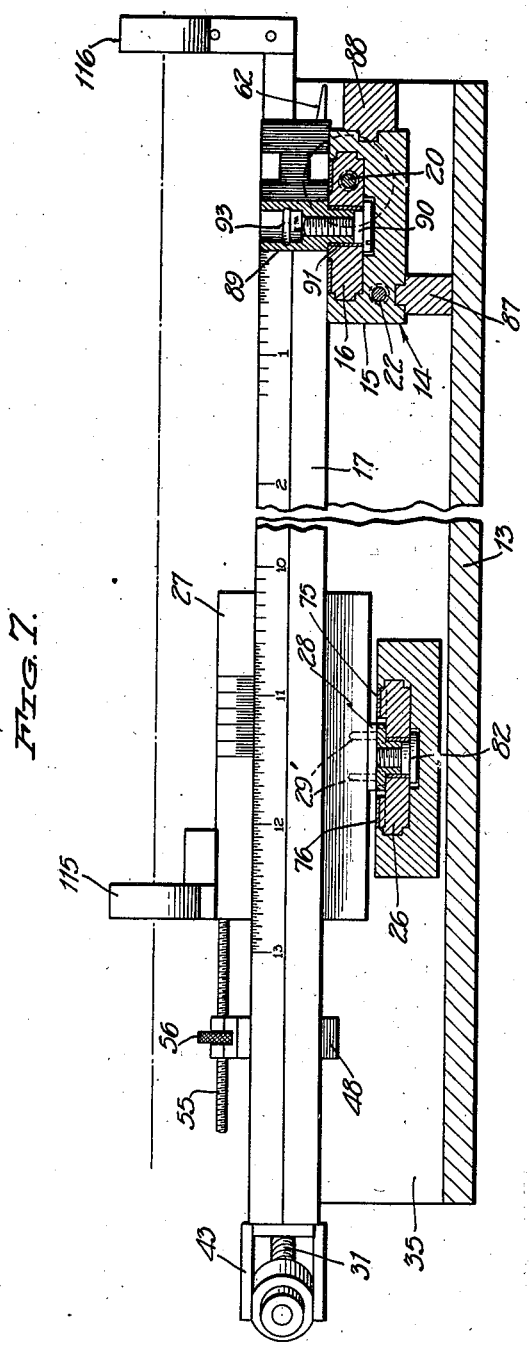
ALBERT T. HARRIS.
INVENTOR.

Jan. 5, 1943.  A. T. HARRIS  2,307,584
CALCULATING DEVICE
Filed July 29, 1940   6 Sheets-Sheet 5
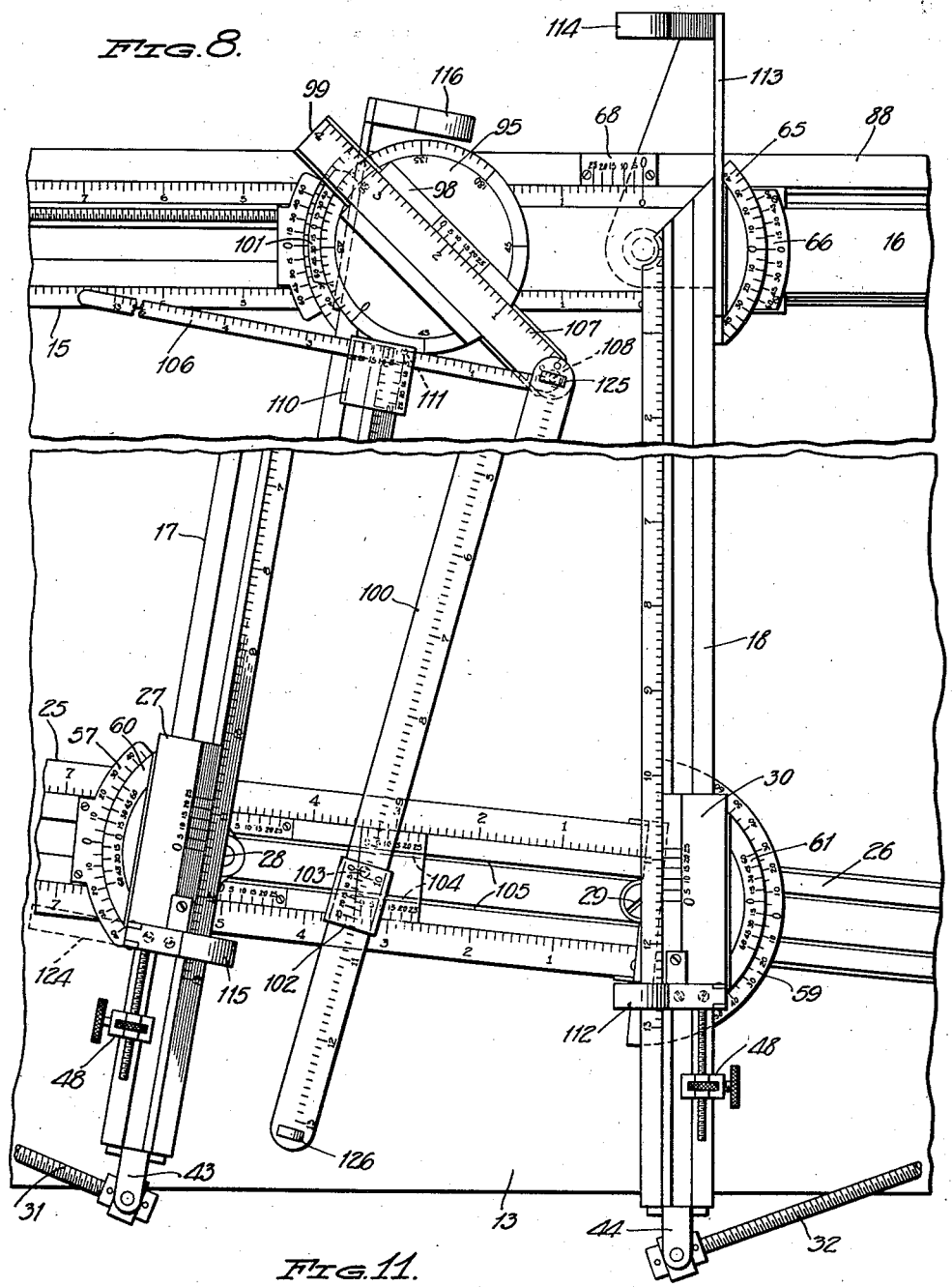
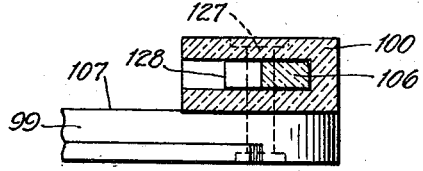
ALBERT T. HARRIS.
INVENTOR.
BY *Herbert J. Smith*
ATTORNEY.

Jan. 5, 1943.  A. T. HARRIS  2,307,584

CALCULATING DEVICE

Filed July 29, 1940  6 Sheets-Sheet 6

ALBERT T. HARRIS.
INVENTOR.

BY Herbert J. Smith
ATTORNEY.

Patented Jan. 5, 1943

2,307,584

UNITED STATES PATENT OFFICE 2,307,584

CALCULATING DEVICE

Albert T. Harris, New York, N. Y., assignor to Cal-Ku-Scope Inc., New York, N. Y., a corporation of New York Application July 29, 1940, Serial No. 348,132

20 Claims. (Cl. 33—76)

This invention pertains to calculating devices and more particularly to a device for use in conjunction with mechanically calculating problems having trigonometric and/or geometric functions, and is a geometrical instrument for working out problems by setting the device with known angles and measurements and obtaining the result by observation.

Heretofore, no mechanical device has been provided for doing trigonometric and geometric problems mechanically, and this invention contemplates mechanically calculating such problems where three or more angles are involved.

The present invention embraces certain fundamental functions which are clearly set forth in my copending application Serial Number 344,571 and also utilizes new basic functions and modifications thereof which are disclosed in this application.

In the present invention, four dimensions may be utilized in that four sides of a geometrical figure may be used in conjunction with the afore associated angles. All four sides of the calculating device are connected by pivotal means, and the members representing the four sides each are graduated and have vernier rules associated therewith for precision reading. The four angles each have protractors which may be read in conjunction with the protractor vernier for precision reading of the angles. Threaded means are used on each of the sides of the four fundamental angles for manipulating with precision the movement of the pivot point of one angle in relation to an adjacent side. Provisions are made so that three angle problems may be worked out, which is done by sliding two opposite sides together so that they have a common pivot point for mechanically calculating problems.

An intermediate arm is introduced in the instrument for working out problems involving angles within the confines of the four fundamental angles and also for determining the length of the side represented by the intermediate arm.

The instrument also may be used for obtaining sights on distant objects to obtain the distance from said object or to mechanically read the dimensions thereof such as height and width, and thereafter utilizing a simple mathematical formula to conclude the problem.

While the calculating device set forth has many objects, it is intended to provide primarily means for mechanically calculating general problems having trigonometric and geometric functions, and other problems which generally utilize in their calculations, angles, and lengths of sides, which problems may require sights for observing distant objects to properly set the instrument.

A further object of the invention is to provide a geometrical instrument utilizing pivoted straightedges with sliding members associated therewith to obtain three, four, and more angles, and/or lengths of the associated sides involved in the problems.

A further object of the invention is to provide a geometrical instrument which uses sights as a part of said instrument to take certain measurements and/or angles regarding distant objects such as elevation and width of the object and distance therefrom.

Further objects of the invention may be and may become apparent to those skilled in the art from a perusal of the following specifications and drawings.

In the drawings:

Fig. 1 is a plan view of the basic calculating device.

Fig. 2 is an enlarged plan view of Fig. 1 partly broken away.

Fig. 3 is a front view of Fig. 1.

Fig. 4 is a cross-section taken along lines 4—4 of Fig. 2 to show the internal construction of the secondary member and associated parts.

Fig. 5 is a cross-section taken along lines 5—5 of Fig. 2.

Fig. 6 is a side view of Fig. 2 partly broken away.

Fig. 7 is a cross-section taken along lines 7—7 of Fig. 2.

Fig. 8 is a modification of Fig. 1 with additional parts for solving more intricate problems, primarily for taking sights.

Fig. 11 is a view taken along lines 11—11 of Fig. 9 to show the cross rule folded back into the intermediate arm.

Fig. 12 is a modification of means for manipulating the threaded operating member of certain of the master arm controls.

Figure 9:
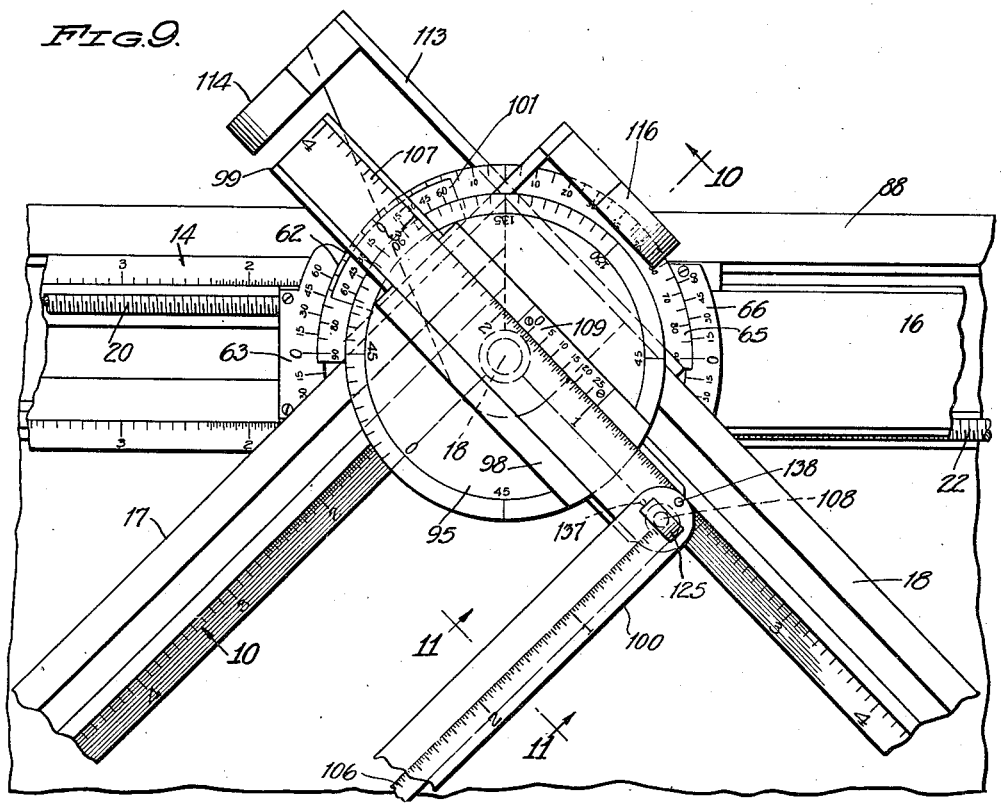
Fig. 9 is a view showing the left master and right master arms at 90 degrees angle, associated with the intermediate arm and disc rule.

Referring to the drawings and more particularly to Fig. 1, the master base 13 has a primary member 14 comprising a primary base 15 and primary slide 16. The primary base 14 is fixed in relation to longitudinal movement with the master base. The left master arm 17 is pivoted at 18 to the slide 16. The right master arm 18 is pivoted to the primary base 15 at substantially a point 19. The screw 20 is held in position by stops 21, while the screw 22 is held in position in relation to the base by stops 23. Screw 20 is threadedly connected to the slide 16 and the screw 22 threadedly connected to the base 15, so that there may be relative movement between each base and slide by manipulation of the screws 20 and 22.

The secondary member 24 has a secondary base 25 and secondary slide 26, which slide moves along grooves in the secondary base 25. The left master vernier 27 moves along the left master arm 17, said left master vernier being pivoted substantially at a point 28. The right master arm carries the right master vernier 30 which is secured to the secondary base 25 and pivoted at a point 29. The secondary member 24, therefore, has longitudinal movement supported by the left and right master vernier and one vernier may be moved in a greater distance along its respective master arm than the other vernier, so that any angular relation may be had between the primary member, secondary member, left master arm and right master arm. Screws 31 and 32 are the left and right secondary screws respectively for lateral movement of the left and right master arms respectively. Screw 31 is pivoted at point 33, while screw 32 is pivoted at point 34. Angle irons 35 and 36 are secured to the master base, carrying swivel boxes 37 and 38 which have threaded members 39 and 40 (Fig. 2) which permit the screws to be rotated by turning the knurled members 41 and 42 respectively. The free ends of the screws 31 and 32 are pivoted in the extensions 43 and 44 respectively, which extensions are fastened to the free ends of the left and right master verniers respectively, by any convenient means such as screws 45. The extensions 43 and 44 have shoulders such as 46 on either side of a working member 47 which is pivoted to the extension such as 43. By this arrangement, it will be seen that a rotation of the knob 42 will cause the free end of its respective master arm to move depending on direction of the rotation of the knurled member such as 42.

While the four screws 20, 22, 31 and 32 are shown at the outer ends as having means which require them to be screwed in and out through the entire length of the screw it is to be understood that any convenient means may be used to provide more rapid manipulation by having means which can be moved along the screws and then locked to afford manipulation of the screw thereafter substantially similar to the arrangement hereinafter explained in regards to the manipulation of the left and right master verniers.

Referring particularly to Fig. 2, there are shown parts for general manipulation of the left and righth master verniers. Referring particularly to Figs. 2 and 5, clamp 48 is shown having tongues 49 and 50 which slide in grooves 51 and 52. The clamp 48 is connected to the master vernier by screw 53 and is threadedly engaged in such clamp so that a rotation of the screw 53 by the knurled member 54 in the proper direction will cause the clamp to be securely locked at its respective master arm such as 17. One end of a screw 55 is secured to the master vernier such as 27, while the free end thereof threadedly engages the knurled nut 56 so that rotation of the nut 56 when the screw 53 is locked against the master arm, will cause the vernier to move to and fro along its respective master arm. This operation is the same for the right master vernier.

The left secondary protractor 57 is secured to the secondary base by any convenient means such as screws. The left secondary vernier 60 is secured to the left master vernier by means of screws, while the right secondary vernier 61 is secured to the right master vernier by any convenient means such as screws. By this arrangement it will be seen that any longitudinal movement of either master vernier will vary angles C and D and that this angular relation may be read on the secondary left and right protractors in conjunction with the secondary left and right verniers.

The primary member 24 has a left primary protractor 62 and a left primary vernier 63, the left primary protractor being secured to the left master arm while the left primary vernier is secured to the slide 16 by means of screws 64. The right master protractor 65 is secured to the right master arm while the right primary vernier 66 is secured to the primary base 15 by the means of screws 67. It will, therefore, be seen that as the left arms are moved on their respective pivot points 18 and 19, the angles A and B will be varied and their angles read on the protractors 62 and a left primary vernier 63, the left primary protractor being secured to the left master arm while the left primary vernier is secured to the slide 16 by means of screws 64. The right master protractor 65 is secured to the right master arm while the right primary vernier 66 is secured to the primary base 15 by the means of screws 67. It will, therefore, be seen that as the left arms are moved on their respective pivot points 18 and 19, the angles A and B will be varied and their angles read on the protractors 62 and 65 respectively in relation to their verniers 63 and 66.

A small scale 68 is secured to the master base portion which small scale has readings thereon, so that when the zero reading 69 engages a graduation indicating a zero reading 70 on the base member 15, it is indicated that the pivot point 19 is exactly in the lateral center of the master base. Verniers 71 and 72 are used in conjunction with the scales 73 and 74 respectively. The verniers 75 and 76 are read in conjunction with scale 77 and 78 respectively, so that the exact reading may be obtained between the discs of the various pivot points. It will be seen that the zero readings of the verniers 75 and 76 and also 72 and 73 of the primary member is directly below the graduated edge of the left master arm when the left master arm has the angle A at 90 degrees with the primary member 24. It will be noted that the zero readings on the secondary base member are on the graduated edge of the right master arm in line with the zero readings on the primary member when the angle B is 90 degrees from the primary member.

A more detailed construction of the apparatus will be shown in the cross sectional view of Fig. 4 shown in conjunction with the front view of Fig. 3. The left master vernier has the left secondary vernier 60 secured thereto by screws such as 79 and the peripheral edge of said vernier as adjacent to the left secondary protractor. The slide 26 is pivotally connected to the left master vernier 27. A plate 28 has one end thereof secured to the lower portion of the left master vernier by means of screws 29'. The plate 28 has a hub 80 which fits into a metallic shield 81 which shield is secured into the slide proper. The hub of the plate 28 which is attached to the left master vernier is held in pivotal relation with the shield 81 which is securely fixed in the slide by means of a screw 82, which screw is threadedly connected into the hub. It will therefore, be seen that the slide can be turned in relation to the master vernier.

The right master vernier 30 has a hub 83 as a part thereof. A strap 84 goes completely around the base member and is secured thereto by means of a screw 85. The upper portion of the strap has a hub 85 thereon which fits into the shield 87, which shield is driven into the hub 83 to provide a working surface between the shield as part of the right master vernier and the hub 86 as part of the secondary base. While the strap 84 is shown adjacent the master base 13 is to be understood that there is no friction there between since the strap may ride on the master base 13 to carry part of the weight of the instrument if it is so desired. It will, therefore, be seen that the movement of the right master vernier may be had through the rotatable axis provided within the construction of the hub 83.

The front view in Fig. 3 shows the working members such as 48 with shoulders 46 on either side thereof, of each of the working members so that the rotation of the knobs 41 and 42 will give lateral movement to the free ends of the master arms. Since the working members 47 are pivoted about pins 48 which protrude from opposing sides of the working member.

Fig. 7 shows detailed construction of the connection between the secondary slide 26 and the left master vernier 27. The screws 29' are seen holding the plate 28 in fixed relation to the left master vernier, which plate is pivotally connected to the slide by means of the screw 82.

The primary slide 14 has a guide member 87 on the lower portion thereof, which guide member is secured to the master base by any convenient means such as screws. The rear guide member 88 is connected to angle irons 35, leaving a space between the guide member 88 and the base 13. In this manner the primary base may slide on the guides 87 and 88 so that the base will be always held in a fixed position in relation to the master base to assure accuracy in the readings of the various protractors and rules. The hub 89 is attached to the far end of the left master vernier by a screw 90 in substantially the same manner as is screw 82 which connects the secondary slide to the left master vernier. The adjacent screws 20 and 22 are shown threadedly connected to their respective members. A shield 91 is affixed to the slide 16 and the lower portion of the hub 89 extends thereinto, so that the screw 90 will permit a pivotal joint between the left master arm and the primary member by means of the primary slide 16. It will be noted that the upper portion of the hub 89 has a circular detent 93 therein, the purpose of which will be set out in detail later in this specification.

The view shown in Fig. 6 is substantially self-explanatory but is partly broken away to show the protractor 59, which is mounted onto the semi-circular head 94 which is an integral part of the secondary base member 25 of the secondary member 24 as a unit. The right secondary vernier 61 is shown with its peripheral edge adjacent the right secondary protractor 59.

Figure 10:
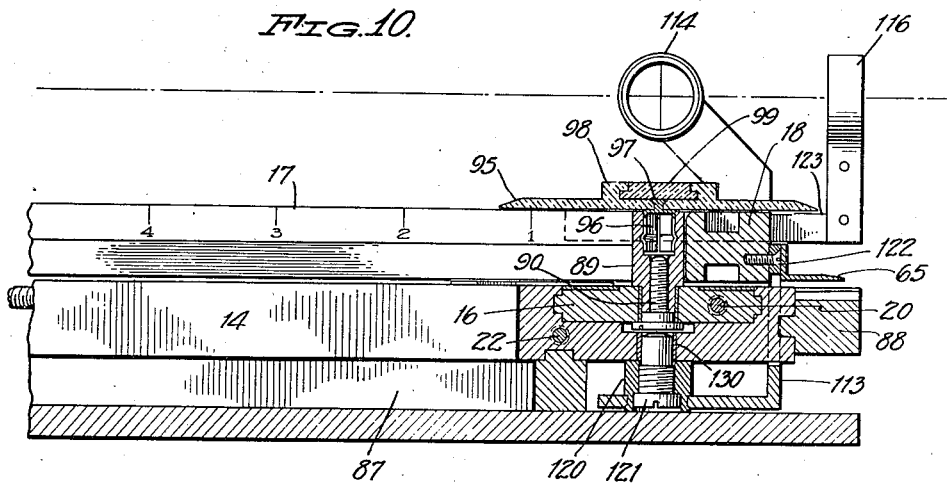
Fig. 10 is a sectional view taken along lines 10—10, of Fig. 9 shown in relation to the master base.

The view shown in Figs. 9 and 10 embrace the modification which permits a disc protractor 95 to be secured to the rule and more particularly to the hub 89 on the far end of the left master arm. A spring snap 96 is secured by a headed pin 97 to the center of the disc protractor, which disc protractor has the snap 96 urged into the opening of the upper part of the hub. The ridge of the snap fit into the detent 93 more clearly shown in Fig. 7. A disc base 98 has grooves therein to receive the tongues of the slide 99 which slide is pivotally connected to the intermediate arm 100. The disc protractor is graduated and is read against the disc vernier 101. Referring to Figs. 8 and 9 particularly, it will be seen that the intermediate arm 100 has an intermediate arm slide 102, which is preferably of transparent material and is mounted on the arm as by a pin 103, and is pivotally mounted to an intermediate base slide, the lower side of which base slide has tongues 104 which slide in grooves 105. The vernier readings on the intermediate base slide can be read against either scale of the base and coincide with the zero reading on the slide 102. A cross rule 106 is pivoted on the same point as the intermediate arm 100 to the disc rule 107 at pivot point 108. The graduations on the disc rule 107 are read against the disc rule vernier 109. The disc rule has a member preferably transparent 110, which slides thereon and has a pin 111 which is suspended downwardly and nearly touches, or may touch the graduated portion of the left master arm.

While the drawings indicate that the slides 102 and 110 are transparent, it is to be understood that they may be made out of any suitable opaque or translucent material, and may be wholly or partly transparent as the desires of the case may dictate. The master arm is set forth as being transparent but it is to be understood that this may be made of any opaque material such as steel, or other equivalents may be introduced to correspond with the necessary changes without departing from the spirit of the claims.

The calculating device as set forth, not only may be used for figuring geometrical problems that can be set up on the scale with certain known angles and measurements, but the device may also be used where it is desirable to sight objects beyond the confines of the master base. With this in mind, sights are located at convenient places on the apparatus for the purpose of determining mechanically the distance from a known object, or the size of the object such as the height and width.

To this end, a sight 112 is located on the right master vernier. On the far end of the right master arm is an extension 113 having a sight 114 affixed thereto. A sight 115 is located on the left master vernier while a sight 116 is located on the far end of the left master arm.

Referring to Fig. 9, the left and right master arms have been moved together so that the center of the hub 89 has moved over the center pivot point 119 of the right master arm. The bracket 113 carrying the sight 114 has been described as being fixedly connected to the far end of the right master arm, and a portion about the pivot point is shown dotted, indicating that this portion is below the surface of the primary member. The member 113 is a U shaped member having the top leg secured to the far end of the right master arm by any convenient means such as screw 122, while the lower leg of the U shaped bracket 113 has a flange 114 thereon, which flange extends about the boss 120 and is securely connected thereto at the lower portion of the boss. The U shaped member 113 is so shaped because it is necessary, when in a position shown in Fig. 9, to swing about at an angle, and in order to do this it must move about the guide 88. A screw 121 goes through the boss 120, and into a tubular member 129 which is secured into a hole 130 in the primary base. The screw 122 is shown securing the upper end of the bracket 113 to the tip of the far end of the right master arm with the sight 114 fixed thereto. The bracket 123 is secured to the far end of the left master arm by screws such as shown for securing the sight bracket 113 to the right master arm. The sight 115 has a dotted portion 124 which indicates that the sight 115 may be thrown back to an off-normal position when it is necessary to bring the left and right master arms in close proximity to one another.

The intermediate arm 100 has a sight 125 near the pivot point thereof, while the sight 126 is on the free end thereof, which sights have their hairline centers in line with the pivot points of the intermediate arm and the pin 103 on transparent slide 102.

Fig. 11 shows the intermediate arm 100 with the pin 127 connecting same to the disc rule 107. The cross arm 106 is pivoted on pin 127 by the shoulder 128. The pin 127 has heads on either end thereof to hold the parts intermediate its length in relation one to the other.

The modifications shown in Fig. 12 is used when the master arms are required to be moved nearer the sides of the device than would be permitted for efficient operation if the bracket 37 for screw 31, was permanently fixed to the flange 35. In Fig. 12 the master base 13 has the flange 35 secured thereto which flange has a groove 131 below a slot 132 which groove and slot are substantially the length of the flange. The bracket 133 is similar to bracket 37 with a clamp 134 secured thereto having a tongue 135 thereon which rides in the groove 131. A clamp screw 136 is threadedly connected to the clamp and is used to lock the clamp in a fixed position along the master base flange 35.

When the master arms are at right angles as shown in Fig. 9, the disc slide may be rotated so that the zero reading of the disc protractor is in registry with the zero reading of the disc vernier, indicating that the pivot point 103 of the intermediate arm is directly over the front edge of the graduated right master arm.

Knowing the distance on the disc slide, it is possible to set the intermediate arm parallel with the left master arm. The intermediate arm may be moved into alignment with the disc rule by having the ball point, 137, engage the detent 138 so that angular readings may be taken about the pivot point 18 of the left master arm. The cross rule 106 will register the distance from the pivot point 108 of the intermediate arm to the graduated front edge of the left master arm. It will be seen that many angles and problems may be worked with this arrangement and that distances and angles used on problems involving such angles and measurements within the confines of the four angles A, B, C, and D.

In order to obtain a distance from a given point beyond the confines of the master base the operator of the device may sight the distance point through the sights 112 and 114 so that the center hairlines thereof are properly aligned, and this operation may be repeated by keeping the right master arm stationary and manipulating the left master arm so that the hairlines of the sight 115 and 116 of the left master arm are properly aligned with the distant point. By observing the device, it is possible to apply a simple mathematical formula to mathematically calculate the distance from the instrument to the distant point. The sights 125 and 126 on the intermediate arm may also be used in much the same manner as the sights on the master arms for any desired purpose. From the foregoing, it will be seen that the objects set out herein may be readily accomplished.

The device is not restricted to the specific parts and construction embraced in the disclosure, but may be modified or changed in any manner to embrace any and/or all equivalents within the scope of the annexed claims.

What is claimed as new and desired to secure by Letters Patent of the United States is:

1. A geometrical instrument of the class described comprising a slidable primary member, a slidable secondary member, said primary and secondary member each comprising a base portion and a slide portion, and a pair of graduated master arms, each of said master arms being respectively pivotally connected to the primary and secondary members, and protractor means for registering the angle at each of the pivotal connections of the members.

2. A geometrical instrument as set forth in claim 1 wherein one of said master arms is connected on one end to one portion of the primary member and the other end thereof connected to one portion of the secondary member, the other of said master arms being connected to the remaining portion of the primary member while the opposing end of said remaining arm is connected to the remaining portion of the secondary member.

3. A geometrical instrument as set forth in claim 1 having a master base for mounting the primary and secondary members, side supports mounted on the master base, and threaded means rotatably mounted on the side supports and threadedly connected to the slidable primary member to provide lateral movement therefor.

4. A calculating device of the class described comprising a pair of spaced master arms, a slidable primary member, a slidable secondary member, the primary and secondary members each comprising a base portion and a slide portion, means for pivotally connecting one end of each of said master arms to the slide and base portions of the primary member, and means for connecting each of the opposing ends of the master arms to the slide portion of the secondary member.

5. A calculating device as set forth in claim 4 wherein means is provided whereby the master arms affixed to the primary member may be brought together to have a common pivot point.

6. A calculating device of the class described as set forth in claim 4 wherein each of the master arms has a slide on either end thereof for determining the angular relation of a point of a given object beyond the confines of the master base.

7. A calculating device of the class described as set forth in claim 4 wherein each of the master arms has a slide on either end thereof for determining the angular relation of a point of a given object beyond the confines of the master base and a protractor is affixed about each of the pivot points to determine the angle of the adjacent sides of the calculating device.

8. A calculating device of the class described as set forth in claim 4 wherein each of the master arms has a slide on either end thereof for determining the angular relation of a point of a given object beyond the confines of the master base, including a protractor affixed about each of the pivot points to determine the angle of the adjacent sides of the calculating device, and a protractor vernier adjacent each of said protractors for a more precise reading of the angle of the adjacent sides.

9. A calculating device of the class described comprising a pair of spaced graduated master arms, a slidable primary member, a slidable secondary member, the primary and secondary members each comprising a base portion and a slide portion, means for pivotally connecting one end of one master arm to one portion of said primary member and means for connecting the other end of said master arm to one portion of the secondary member, means for pivotally connecting one end of the remaining master arm to the remaining portion of the primary member, means for pivotally connecting the opposite end of the remaining master arm to the remaining portion of the secondary member, protractor means on each of said portions of the primary and secondary members to register the angular relation between each of the master arms and its adjacent primary or secondary member.

10. A calculating device of the class described comprising a pair of spaced, graduated, master arms, a slidable primary member, a slidable secondary member, the primary and secondary members each comprising a base portion and a slide portion, means for pivotally connecting one end of one master arm to one portion of said primary member and means for connecting the other end of said master arm to one portion of the secondary member, means for pivotally connecting one end of the remaining master arm to the remaining portion of the primary member, means for pivotally connecting the opposite end of the remaining master arm to the remaining portion of the secondary member, protractor means on each of said portions of the primary and secondary members to register the angular relation between each of the master arms and its adjacent primary or secondary member, a disc protractor pivotally mounted at one of the pivot points, connecting one of said master arms to its respective portion of the primary member, a disc rule slidably connected to the disc protractor, and intermediate arm connected to one end of the disc rule, and slide means operable along said intermediate arm movably connected to an intermediate base slide engaging one portion of the secondary member.

11. A calculating device of the class described as set forth in claim 10 wherein the pivot point connecting the intermediate arm and the disc rule is common to a pivot point for a cross rule, slide means on said cross rule, and means on said slide dependent therefrom to register with graduations on the master arm.

12. A geometrical instrument having a master base, a pair of supports connected to the base, a primary member mounted on said supports, a pair of master arms mounted on said primary member, a secondary member also mounted on said supports, said secondary member comprising a base portion and a slide portion, said base portion being pivotally connected to one end of one master arm and the slide portion being pivotally connected to one end of the other master arm, and a protractor means about each of the pivotal points to register the angle among the several aforementioned arms.

13. A geometrical instrument as set forth in claim 12 having pivotal means for connecting the one end of each of the master arms to the primary member.

14. A geometrical instrument having a master base, a pair of supports connected to the base, a primary member mounted on said supports, a pair of master arms pivotally mounted on said primary member, a secondary member also mounted on said supports, said secondary member comprising a base portion and a slide portion, said base portion being pivotally connected to one end of one master arm and the slide portion being pivotally connected to one end of the other master arm, a protractor means about each of the pivotal points to register the angle among the several aforementioned arms, and a pair of adjustment means mounted on said supports, one end of one of the adjustment means being threadedly connected to one portion of the secondary member and one end of the other of the adjustment means being threadedly connected to the remaining portion of the secondary member.

15. A calculating device of the class described comprising a base, a plurality of interslidable means slidably associated with said base, master arms connected with the interslidable means, pivotal means forming the connections whereby said arms may assume angular positions with respect to the direction of sliding movement of said interslidable means and each other, and means associated with one of said pivotal connections whereby one of the arms may be selectively attached thereby providing for association of two arms at the same connection to provide for a common vertex for said arms.

16. A calculating device of the class described comprising a base, a plurality of interslidable means slidably associated with said base, master arms connected with the interslidable means, pivotal means forming the connections whereby said arms may assume angular positions with respect to the direction of sliding movement of said interslidable means and each other, and a detachable connection at one of said pivotal connections whereby one of said arms may be brought into detachable pivotal association with another of said arms to provide a common vertex.

17. A calculating device of the class described comprising a base, pairs of slide members shiftably carried on said base in spaced opposed relation and movable relative to each other, a master arm connected with one slide member of each pair of slide members and bridging the base and power means associated with said base for positively effecting movement of said slide members.

18. A calculating device of the class described comprising a base, pairs of slide members shiftably carried by said base in spaced opposed relation and movable relative to each other, a master arm connected with one slide member of each pair of slide members, means pivotally connecting each end of the arm with its respective slide member, and power means for positively moving said slide members.

19. A calculating device of the class described comprising a base, pairs of slide members movably carried on said base in spaced opposed relation and movable relative to each other, a pair of master arms each connected with opposed slide members of each pair of slide members, means movably connecting each arm to its respective slide members and positive power means for effecting minute adjustments of said slide members.

20. A calculating device of the class described comprising a base, pairs of slide members movably carried on said base in spaced opposed relation and movable relative to each other, a pair of master arms each connected with opposed slide members of each pair of slide members, means pivotally connecting each arm to its respective slide members, protractor means at each pivotal connection for determining the angular relation of each arm at its pivot and positive drive means for effecting minute adjustments of each end of each arm.

ALBERT T. HARRIS.